(12) United States Patent
Zimmer et al.

(10) Patent No.: US 9,885,523 B2
(45) Date of Patent: Feb. 6, 2018

(54) LIQUID TO LIQUID MULTI-PASS COUNTERCURRENT HEAT EXCHANGER

(71) Applicant: Caloris Engineering, LLC, Easton, MD (US)

(72) Inventors: Artur G. Zimmer, Oxford, MD (US); Daniel J. Neth, Easton, MD (US)

(73) Assignee: Caloris Engineering, LLC, Easton, MD (US)

( * ) Notice: Subject to any disclaimer, the term of this patent is extended or adjusted under 35 U.S.C. 154(b) by 663 days.

(21) Appl. No.: 14/208,136

(22) Filed: Mar. 13, 2014

(65) Prior Publication Data

US 2014/0262162 A1    Sep. 18, 2014

Related U.S. Application Data

(60) Provisional application No. 61/793,902, filed on Mar. 15, 2013.

(51) Int. Cl.
F28D 9/00    (2006.01)
B23P 15/26   (2006.01)
(Continued)

(52) U.S. Cl.
CPC ............ *F28D 9/0006* (2013.01); *B23P 15/26* (2013.01); *F28D 7/06* (2013.01); *F28D 7/1646* (2013.01);
(Continued)

(58) Field of Classification Search
CPC ...... F28F 9/00; F28F 9/02; F28F 9/026; F28F 9/028; F28F 9/22; F28F 9/0131;
(Continued)

(56) References Cited

U.S. PATENT DOCUMENTS

| 1,525,094 A | * | 2/1925 | Jones | F28F 9/22 165/109.1 |
| 1,672,650 A | * | 6/1928 | Lonsdale | F28F 9/22 165/160 |

(Continued)

FOREIGN PATENT DOCUMENTS

| DE | 21 11 387 A1 | 9/1972 | |
| GB | 766 614 A | 1/1957 | |
| RU | 2306516 | * 9/2007 | F28D 7/00 |

OTHER PUBLICATIONS

Notification of Transmittal of The International Search Report and The Written Opinion of the International Searching Authority, or the Declaration issued in International Application No. PCT/US2014/025508 dated Jul. 14, 2014.

*Primary Examiner* — Len Tran
*Assistant Examiner* — Gustavo Hincapie Serna
(74) *Attorney, Agent, or Firm* — Finnegan, Henderson, Farabow, Garrett & Dunner LLP

(57) ABSTRACT

A heat exchanger including a shell forming a generally cylindrical housing, a plurality of dividers within the shell extending along the length of the shell, wherein the dividers separate the shell into sections and each section forms a shell pass. The heat exchanger can further include a plurality of tube passes, wherein at least one tube pass is contained within each of the shell passes, and each tube pass comprises a plurality of tubes extending along the length of the shell, a shell inlet passage configured to receive a first fluid into a first shell pass and a shell outlet passage configured to discharge the first fluid from a last shell pass, and a plurality of shell pass passages formed in the dividers near a first end or a second end of the shell configured to allow flow of the first fluid from one shell pass to the next shell pass. In addition, the heat exchanger can include a tube inlet passage configured to receive a second fluid into a first tube pass and (Continued)

a tube outlet passage configured to discharge the second fluid from a last tube pass and a pair of shell heads configured to couple to the first end and the second end of the shell, wherein the shell heads are divided into a plurality of sections and each section is configured to route flow of the second fluid from one tube pass to the next tube pass.

9 Claims, 12 Drawing Sheets

(51) Int. Cl.
| | |
|---|---|
| F28F 9/013 | (2006.01) |
| F28F 9/02 | (2006.01) |
| F28F 27/02 | (2006.01) |
| F28D 7/06 | (2006.01) |
| F28D 7/16 | (2006.01) |
| F28F 9/22 | (2006.01) |

(52) U.S. Cl.
CPC .......... *F28F 9/0131* (2013.01); *F28F 9/0133* (2013.01); *F28F 9/0202* (2013.01); *F28F 27/02* (2013.01); *F28F 2009/224* (2013.01); *Y10T 29/4935* (2015.01); *Y10T 29/49393* (2015.01)

(58) Field of Classification Search
CPC ........ F28F 9/0133; F28F 9/0202; F28F 27/02; F28F 2009/224; F28D 3/00; F28D 3/02; F28D 3/04; F28D 9/0006; F28D 9/00; F28D 7/06; F28D 7/1646; B23P 15/26; Y10T 29/4935; Y10T 29/49393
USPC .......... 165/157, 159, 160, 177, 178
See application file for complete search history.

(56) References Cited

U.S. PATENT DOCUMENTS

| | | | | |
|---|---|---|---|---|
| 1,683,236 | A * | 9/1928 | Braun | F28B 1/00 165/160 |
| 1,790,828 | A * | 2/1931 | McKnight | F28D 7/1646 165/161 |
| 2,049,748 | A | 8/1936 | Rathbun | |
| 2,919,903 | A | 1/1960 | Vautrain et al. | |
| 3,048,372 | A * | 8/1962 | Newton, Jr. | F28D 7/1607 122/501 |
| 3,730,229 | A | 5/1973 | D'Onofrio | |
| 3,776,302 | A * | 12/1973 | Waszink | F28D 7/1669 122/32 |
| 3,779,312 | A | 12/1973 | Withers, Jr. et al. | |
| 3,831,672 | A | 8/1974 | Battisti | |
| 3,967,677 | A * | 7/1976 | Mohlman | F28F 9/0132 122/510 |
| 4,086,959 | A | 5/1978 | Habdas | |
| 4,105,065 | A * | 8/1978 | Chirico | F28D 7/1638 165/137 |
| 4,111,402 | A | 9/1978 | Barbini | |
| 4,284,133 | A | 8/1981 | Gianni et al. | |
| 4,475,588 | A | 10/1984 | Tsou | |
| 4,493,368 | A * | 1/1985 | Gronnerud | F28D 7/1669 165/159 |
| 4,594,227 | A * | 6/1986 | Ohsaki | B01J 8/0285 422/148 |
| 4,706,646 | A * | 11/1987 | Christianson | F24H 1/28 126/106 |
| 4,778,005 | A * | 10/1988 | Smith | F28D 7/06 165/160 |
| 4,796,690 | A | 1/1989 | Eisinger | |
| 4,813,346 | A * | 3/1989 | Widhopf | C12C 7/22 165/140 |
| 4,858,681 | A * | 8/1989 | Sulzberger | F17D 5/04 165/158 |
| 4,871,014 | A | 10/1989 | Sulzberger | |
| 4,893,670 | A | 1/1990 | Joshi et al. | |
| 4,972,903 | A * | 11/1990 | Kwok | F28F 9/0202 165/158 |
| 5,004,042 | A * | 4/1991 | McMorries, IV | F01P 3/207 123/41.01 |
| 5,355,945 | A * | 10/1994 | Sanz | F28D 7/1669 165/157 |
| 5,375,654 | A | 12/1994 | Hougland et al. | |
| 5,435,155 | A | 7/1995 | Paradis | |
| 6,167,951 | B1 * | 1/2001 | Couch | C02F 1/02 165/159 |
| 6,840,074 | B2 | 1/2005 | Kamino et al. | |
| 6,899,169 | B1 * | 5/2005 | Cox | F28D 7/1607 165/157 |
| 7,610,953 | B2 * | 11/2009 | Mulder | F28D 7/1607 165/160 |
| 8,833,437 | B2 * | 9/2014 | Singh | F22B 1/006 122/488 |
| 2003/0131977 | A1 * | 7/2003 | West | F28D 7/1676 165/159 |
| 2005/0284421 | A1 * | 12/2005 | Penner | F22B 9/12 122/16.1 |
| 2006/0081362 | A1 | 4/2006 | Sanatgar et al. | |
| 2007/0187067 | A1 | 8/2007 | Horiguchi et al. | |
| 2010/0139898 | A1 * | 6/2010 | Hung | F25B 39/02 165/110 |
| 2010/0243208 | A1 * | 9/2010 | Kar | B01J 8/067 165/96 |
| 2011/0056664 | A1 * | 3/2011 | De Larminat | F25B 39/028 165/160 |
| 2012/0138278 | A1 * | 6/2012 | Pacholski | F24H 1/287 165/157 |
| 2013/0081537 | A1 * | 4/2013 | Bikson | F28D 15/00 95/54 |

* cited by examiner

FIG. 3E  FIG. 3F

LIQUID TO LIQUID MULTI-PASS COUNTERCURRENT HEAT EXCHANGER

This application claims the benefit of U.S. Provisional Application No. 61/793,902, filed Mar. 15, 2013, which is incorporated herein by reference.

TECHNICAL FIELD

The present disclosure relates to a liquid to liquid multi-pass countercurrent heat exchanger.

BACKGROUND

In evaporator system technology (and a wide range of liquid processing technologies), multi-pass tube and shell heat exchangers are a common method of heating liquids against saturated steam vapor from the evaporator process. The multi-pass fluid path on the tube side of the heat exchanger is optimized by design to provide turbulent liquid flow for best heat transfer and minimum pressure drop. Multiple flow passes are configured to provide adequate product velocity across the total heat transfer surface area required for the shell side heating medium (steam) to efficiently transfer heat into the product per the design case. The large open area tube shell is baffled to support the tubes and guide the steam vapor across the heat transfer surface towards a venting port. These relatively open tube shells are generally a multiple of the cross sectional area of the heat exchanger tubes and conducive to low pressure drop performance on the shell side.

As opposed to steam heating, there are often opportunities for liquid to liquid processing where a process stream of liquid medium is available for heating or cooling. A typical method for liquid to liquid heat transfer would be utilizing a plate heat exchanger (PHX), which comprises a large bundle of flat plates separated by narrow gaps that can be less than ⅛" wide held apart by ridges that are pressed into the plates. PHXs are suited well for this type of process as the flow paths for product and heating medium are on opposite sides of the same heat transfer plate with equal cross sectional areas for the flow paths. Depending on flow rates available, PHXs can be passed in many variations to provide the best conditions for turbulence, required surface area, pressure drop, and heat transfer. The flexible design of the PHX is easily configured for true counter flow operation, all in a uniquely compact bundle of heat exchange surface. The down side to processing in a PHX is the inherent sensitivity to particulates and precipitates from the products processed in the PHX. PHXs are prone to plugging with unfiltered products, dense concentrates or products that precipitate crystals while being processed. PHXs are also not optimal for vacuum applications due to the leak potential of the numerous gaskets. Spiral heat exchangers are similar to plate heat exchangers in that they consist of a spiral wound pair of metal sheets separated by a gap with product and heating mediums on opposite sides of the same heat transfer plate, except with the plates configured into concentric spirals. Spiral heat exchangers generally have a wider gap between plates than plate heat exchangers, which improves their performance for products containing particulates and precipitates. However, spiral heat exchangers are more expensive to manufacture and still require a significant amount of gaskets. For this and other reasons, tube and shell heat exchangers are often preferred for the heat transfer duties that are required for evaporation systems and other applications. Tube and shell HX's are durable, vacuum tight, include a minimal number of gaskets (e.g., one at each end), can pass large particles and are much more tolerant of formation of fouling layers on the heat exchange surface.

The most common and effective liquid to liquid heat exchanger design being used today is the "Double tube" heat exchanger. These consist of a single pass product tube mounted inside of a slightly larger tube or "tube shell" (i.e., a tube inside a tube). Cross-sectional areas of the center tube and annulus of the tube shell are close to being equal in most cases providing a prime condition for single pass countercurrent heating or cooling of one liquid using another. Very simple in design and function but not suitable for large-scale flow duties, the racks of tubes required for large duties are cumbersome, space consuming, and expensive.

Historically, the standard construction of a multi tube or multi-pass tube & shell heat exchanger is not suited well for liquid to liquid heat transfer where it is beneficial to have comparable volumetric flow rates for both liquid streams. The total cross sectional area between the inner wall of the shell and outer walls of the tubes is many times larger than the total cross sectional area of the tubes inside the shell. To gain meaningful turbulent flow of the heat transfer medium in the shell side, exorbitantly large flow rates and/or extensive cross-sectional internal baffling is required within the tube shell, which in most cases still falls short of an uncompromised counterflow design which permits the heat transfer efficiency and small exit temperature differential capability that is typical for PHEX and spiral heat exchangers.

In consideration of the aforementioned circumstances, the present disclosure provides a liquid to liquid multi-pass countercurrent heat exchanger. It is understood that the use of a liquid to liquid multi-pass countercurrent heat exchanger is not limited to use for only liquid to liquid, but can be used for other mediums as well, such as gases.

SUMMARY

In accordance with the present disclosure, one aspect of the present disclosure is directed to a heat exchanger. The heat exchanger can comprise a shell forming a generally cylindrical housing, a plurality of dividers within the shell extending along the length of the shell, wherein the dividers separate the shell into sections and each section forms a shell pass, and a plurality of tube passes, wherein at least one tube pass is contained within each of the shell passes, and each tube pass comprises a plurality of tubes extending along the length of the shell. The heat exchanger can further comprise a shell inlet passage configured to receive a first fluid into a first shell pass and a shell outlet passage configured to discharge the first fluid from a last shell pass and a plurality of shell pass passages formed in the dividers near a first end or a second end of the shell configured to allow flow of the first fluid from one shell pass to the next shell pass. In addition, the heat exchanger can comprise a tube inlet passage configured to receive a second fluid into a first tube pass and a tube outlet passage configured to discharge the second fluid from a last tube pass and a pair of shell heads configured to couple to the first end and the second end of the shell, wherein the shell heads are divided into a plurality of sections and each section is configured to route flow of the second fluid from one tube pass to the next tube pass.

In another embodiment, the plurality of dividers can extend from the inner wall of the shell towards the center of the shell and can be coupled in the center region of the shell. In another embodiment, a flow of the first fluid through the shell passes can be countercurrent to a flow of the second fluid through the tube passes. In another embodiment, a total cross-sectional area of the plurality of tubes of each tube pass can be substantially equal to a total cross-sectional area outside the plurality of tubes and inside each shell pass. In another embodiment, the heat exchanger can be installed in any vertical, horizontal or angled orientation. In another embodiment, the heat exchanger can be configured to be vacuum tight. In another embodiment, each shell pass can have substantially equal cross-sectional area.

Another aspect of the present disclosure is directed to a heat exchanger comprising a shell forming a generally cylindrical housing having an inner surface, a plurality of dividers within the shell longitudinally extending along the length of the shell and extending axially outward from the center region of the shell toward the inner surface of the shell, the outer axial portion of each divider further comprising a connecting surface configured to mate generally parallel with the inner surface of the shell, wherein the dividers separate the shell into sections and each section forms a shell pass. The heat exchanger can further comprise a plurality of tube passes, wherein at least one tube pass is contained within each of the shell passes, and each tube pass comprises a plurality of tubes extending along the length of the shell. The heat exchanger can further comprise a shell inlet passage configured to receive a first fluid into a first shell pass and a shell outlet passage configured to discharge the first fluid from a last shell pass, a plurality of shell pass passages formed in the dividers near a first end or a second end of the shell configured to allow flow of the first fluid from one shell pass to the next shell pass, a tube inlet passage configured to receive a second fluid into a first tube pass and a tube outlet passage configured to discharge the second fluid from a last tube pass, and a pair of shell heads configured to couple to the first end and the second end of the shell, wherein each shell head is divided into a plurality of chambers and each chambers is configured to route flow of the second fluid from one tube pass to the next tube pass.

In another embodiment, the connecting surface can be formed by bending each divider to create an angle between the two surfaces of about 85 to about 90. In another embodiment, the connecting surface and the shell can be configured for a full weld joint. In another embodiment, the heat exchanger can further comprise a plurality of baffles positioned with the shell passes and configured to receive the plurality of tube passes and maintain the position of the tubes within the shell. In another embodiment, a flow of the first fluid through the shell passes is countercurrent to a flow of the second fluid through the tube passes.

In another embodiment, a total cross-sectional area of the plurality of tubes of the tube pass is substantially equal to a total cross-sectional area outside the plurality of tubes and inside the corresponding shell pass. In another embodiment, the heat exchanger can be installed in a vertical, horizontal or angled orientation. In another embodiment, the heat exchanger can be configured to be vacuum tight. In another embodiment, each shell pass can have substantially equal cross-sectional area. In another embodiment, the length of the heat exchanger can be greater than about 30 ft.

Another aspect of the present disclosure is directed to a method of manufacturing a liquid to liquid multi-pass countercurrent heat exchanger having a first end and a second end, comprising inserting a plurality of tubes through a series of baffles configured to support the plurality of tubes, separating the plurality of tubes evenly into separate tube passes using a plurality of dividers that extend longitudinally along the length of the tubes and extending axially outward from a center region where the plurality of dividers are coupled, the outer axial portion of each divider comprising a connecting surface configured at an angle to the divider. The method can further comprise of spacing a plurality of backing strips along the length of the plurality of tubes and wrapping each strip around the circumference of the tube passes and coupling the strips to the connecting surface of the plurality of dividers, fixing a tube sheet and flange at each end of the plurality of tubes, wherein each tube inserted into each tube sheet passage is sealed, attaching a plurality of shell sections, wherein each shell section extends radially along the circumference of the tubes passes from one divider to the adjacent divider while extending longitudinally along the tubes passes from one backing strip to the adjacent backing strip, wherein each shell section and the two corresponding dividers enclose a portion of a tube shell pass, installing a shell inlet passage configured to receive a first fluid into a first shell pass and a shell outlet passage configured to discharge the first fluid from a last shell pass, and coupling a flanged head to each flange, wherein the flanged shell head is divided into a plurality of chambers and each chamber is configured to route flow of a first fluid from one tube pass to the next tube pass, wherein one of the flanged heads further comprises a product inlet passage configured to receive a second fluid into a first tube pass and a product outlet passage configured to discharge the second fluid from a last tube pass.

In another embodiment, at least a portion of each tube can be corrugated. In another embodiment, attaching each shell section can comprise tack welding the section to the corresponding dividers connecting surfaces and making a lengthwise weld of the tube shell section to form a full weld joint between the shell section and the corresponding connecting surfaces. In another embodiment, the length of the heat exchanger is greater than about 30 ft. In another embodiment, the acute angle between the inner surface of the connecting surface and the divider can be between about 85 degrees and about 90 degrees. In another embodiment, attaching the plurality of shell sections begins at one end and comprises installing the shell sections such that the full circumference of that length of the heat exchanger is covered prior to moving to the next adjacent length of the heat exchanger. A liquid to liquid multi-pass countercurrent heat exchanger manufactured by the method described above.

In another embodiment, the plurality of tubes can be separated into six separate tube passes. In another embodiment, the plurality of tubes are separated into separate tube passes such that a total cross-sectional area of the plurality of tubes of each tube pass is substantially equal to a total cross-sectional area outside the plurality of tubes and inside the corresponding shell pass. In another embodiment, all but one of the dividers includes at least one shell pass passage at either the first end or the second end configured to allow the flow of first fluid from one shell pass to the next adjacent shell pass.

Another aspect of the present disclosure is directed to a heat exchanger comprising a shell forming a generally cylindrical housing having an inner surface, at least two dividers within the shell longitudinally extending along the length of the shell and extending axially outward from the center region of the shell toward the inner surface of the shell, the outer axial portion of each divider further comprising a connecting surface configured to mate generally parallel with the inner surface of the shell, wherein the connecting surfaces and the shell are configured for a full weld joint and the dividers separate the shell into sections and each section forms a shell pass, a plurality of tube passes, wherein at least one tube pass is contained within each of the shell passes, and each tube pass comprises a plurality of tubes extending along the length of the shell, wherein a total cross-sectional area of the plurality of tubes of a tube pass is substantially equal to a total cross-sectional area outside the plurality of tubes and inside the corresponding shell pass.

Additional objects and advantages of the present disclosure will be set forth in part in the description which follows, and in part will be obvious from the description, or may be learned by practice of the present disclosure. The objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure as claimed.

The accompanying drawings, which are incorporated in and constitute a part of this specification, illustrate one embodiment of the present disclosure and together with the description, serve to explain the principles of the present disclosure.

BRIEF DESCRIPTION OF THE DRAWINGS

FIGS. 3E and 3F are schematics of parts of a heat exchanger, showing shell sections, according to an exemplary embodiment.

Reference will now be made in detail to the present embodiments of the present disclosure, examples of which are illustrated in the accompanying drawings. Wherever possible, the same reference numbers will be used throughout the drawings to refer to the same or like parts.

DETAILED DESCRIPTION

The present disclosure is described herein with reference to an illustrative embodiment for a particular application. It is understood that the embodiments described herein are not limited thereto. Those having ordinary skill in the art and access to the teachings provided herein will recognize additional modifications, applications, embodiments, and substitution of equivalents that all fall with the scope of the present disclosure. Accordingly, the present disclosure is not limited by the foregoing or following descriptions.

Figure 1A:
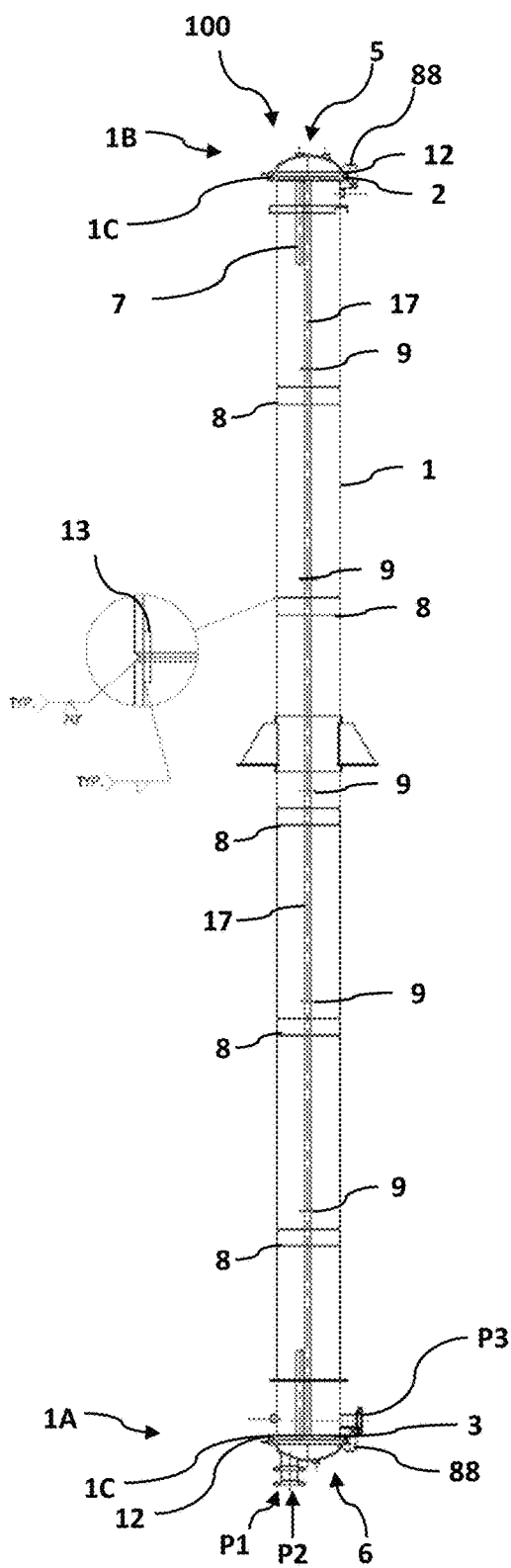
FIG. 1A is a side schematic view of parts of a heat exchanger, according to an exemplary embodiment.

FIG. 1A shows a liquid to liquid multi-pass countercurrent heat exchanger 100, according to an exemplary embodiment. Heat exchanger 100 can comprise a shell 1, as shown in FIG. 1A.

Shell 1 can be an elongated generally cylindrical housing having a first end 1A and a second end 1B. Shell 1 can be formed of one or more metals, metal alloys, or super duplex alloys, for example, carbon steel, stainless steel (e.g., 304 and 316), titanium, copper, and the like. Shell 1 can have a wall thickness ranging from less than $1/16$ inch to more than $3/4$ inch.

Figure 1C:
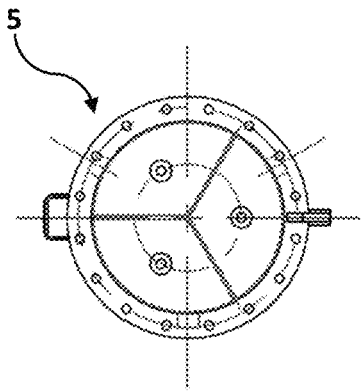
FIG. 1C is a top view of a heat exchanger, according to an exemplary embodiment.
Figure 3A:
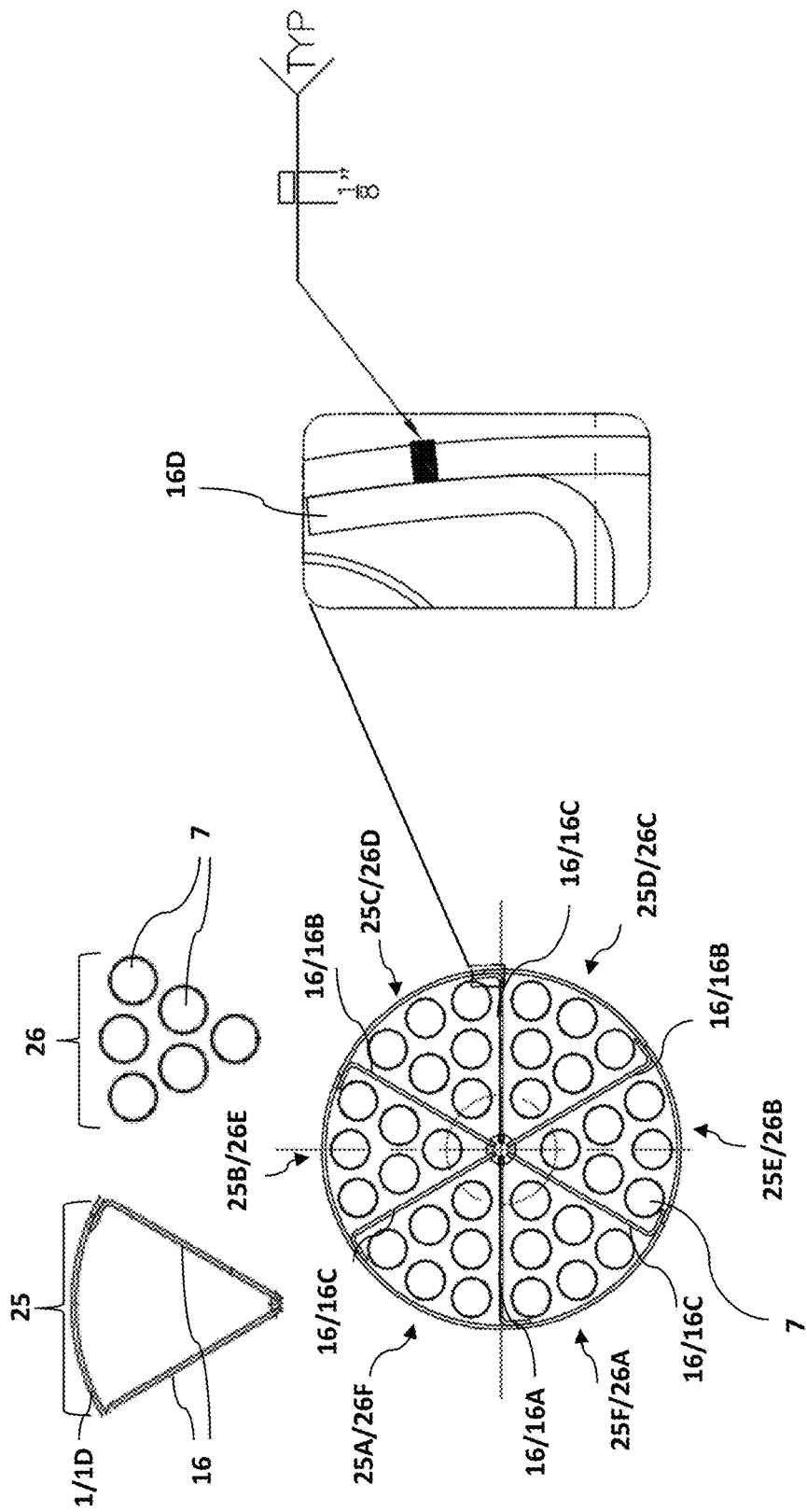
FIGS. 3A and 3B are schematics first end views of parts of a heat exchanger, according to an exemplary embodiment.
Figure 3B:
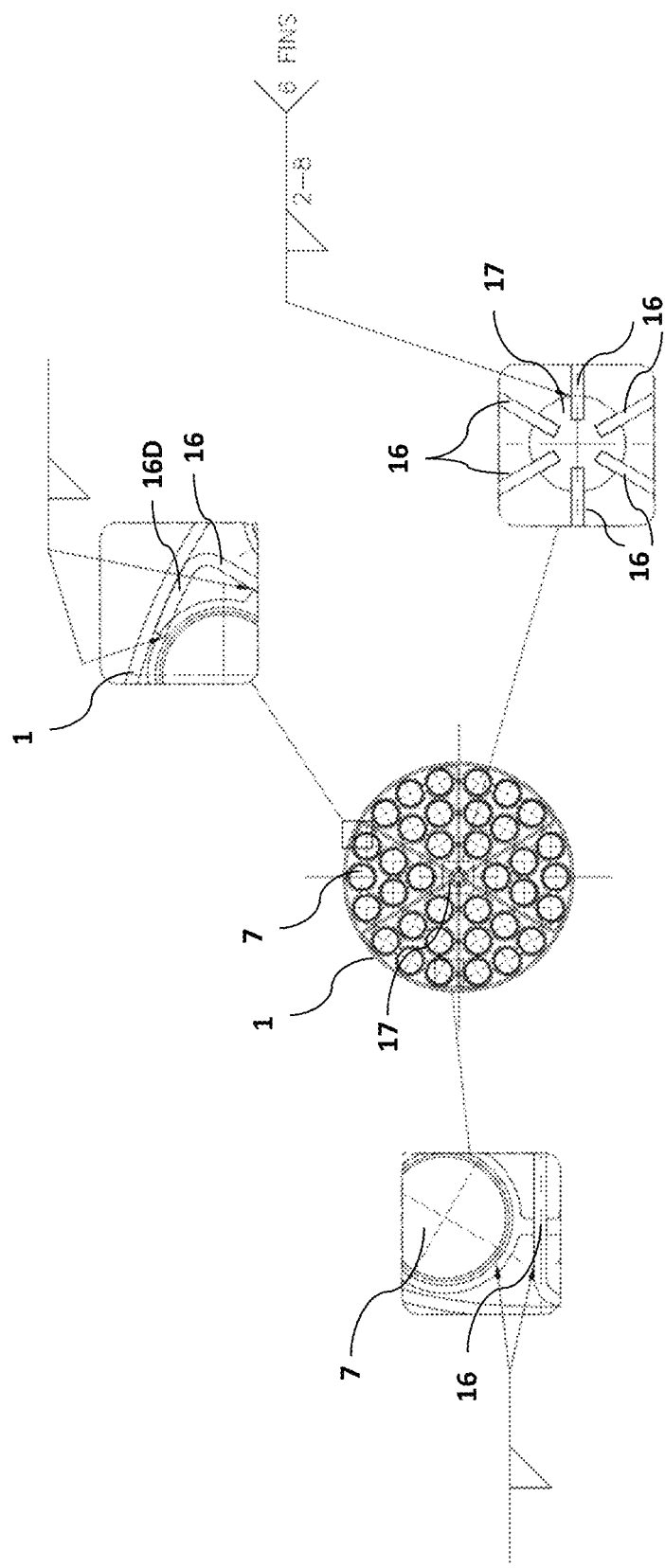

Heat exchanger 100 can further comprise a plurality of dividers 16 (not shown in FIG. 1) within shell 1 longitudinally extending along the length of shell 1 and extending axially outward from the center region of shell 1 toward the inner surface of shell 1. As shown in FIGS. 3A and 3B, dividers 16 can be coupled to a round bar 17 positioned generally in the center of shell 1. Round bar 17 can extend longitudinally along the length of shell 1. Dividers 16 can be evenly spaced around the circumference of round bar 17. The connection between each divider 16 and round bar 17 can be, for example, a hermetic seal (e.g., welded) or can be a slotted fit connection with spot welds as shown in FIG. 3B.

Figures 2A, 2B, 2C:
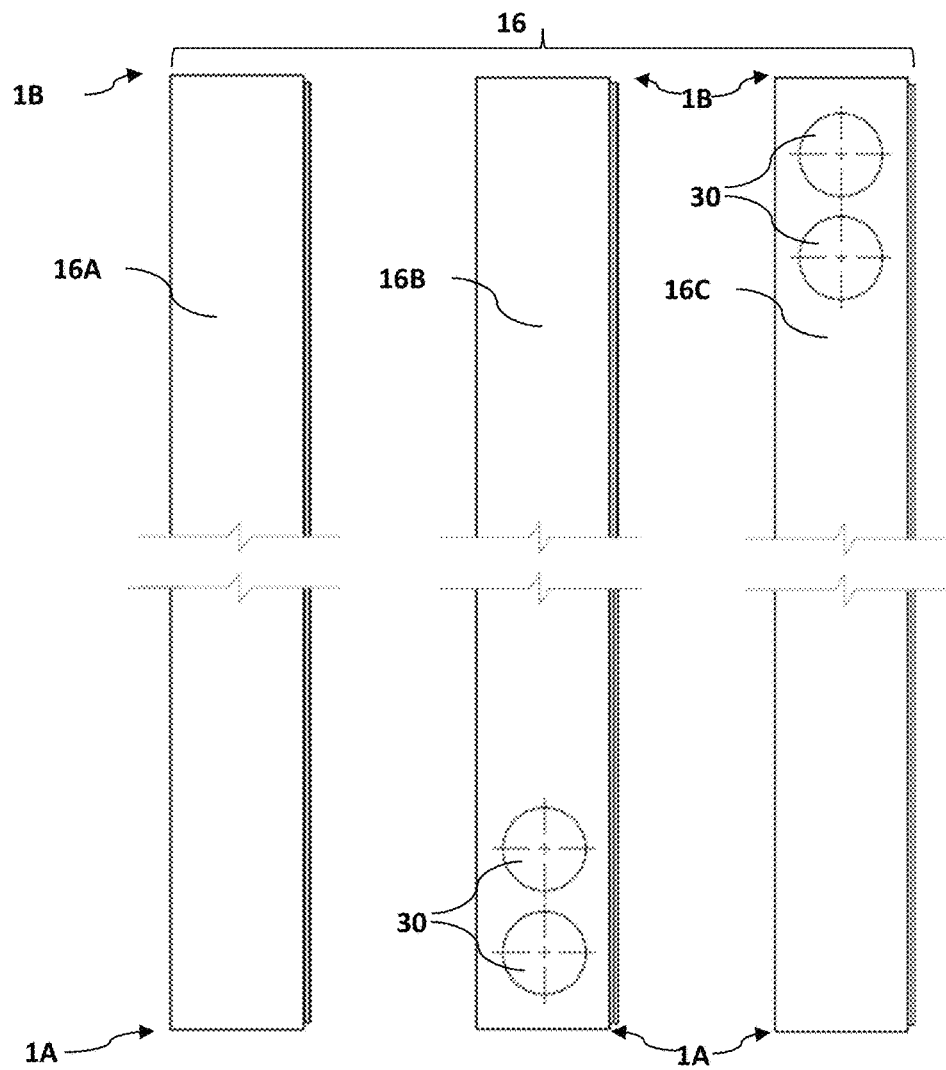
FIGS. 2A, 2B, 2C, and 2D are schematics of a part of a heat exchanger, showing different configurations of dividers, according to an exemplary embodiment.
Figure 2D:
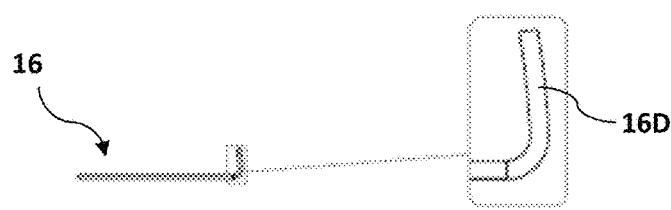

The outer axial portion of each divider 16 can further comprise a connecting surface 16D, as shown in FIGS. 2D, 3A, and 3B. Connecting surface 16D can be configured to mate generally parallel with the inner surface of shell 1, as shown in FIG. 3A. As shown in FIG. 2D, connecting surface 16D can be an extension of divider 16 bent to create an angle between divider 16 and connecting surface 16D of about 85 to about 90 degrees.

As shown in FIG. 3A, the connection between connecting surface 16D and shell 1 can be, for example, formed by a full weld joint configured to form a hermetic seal. In other embodiments, shell 1 can be manufactured with a plurality of laser cut slots 18 as shown in FIGS. 3E and 3F that can line up with connecting surface 16D and allow for plug welding of shell 1 to connecting surface 16D at the slots. Laser cut slots 18 can be about $3/16$ inch wide and staggered along the length of shell 1. The use of non-continuous welds (i.e., plug welds) between shell 1 and connecting surfaces 16D can create the potential for bypassing of fluid from one shell pass to another shell pass between dividers 16 and the inner surface of the shell 1, but minimal bypassing is expected due to the tight fit between the components.

Dividers 16 can be configured to separate shell 1 into sections and each section can form a shell pass 25. As a result of the equal spacing of dividers 16 around round bar 17, shell passes 25 can have a substantially equal cross-sectional area.

The number of dividers 16 and corresponding shell passes 25 can vary. For example, some embodiments can comprise just two dividers forming two shell passes. In other embodiments, three, four, five, or more dividers can form three, four, five, or more shell passes. The exemplary embodiment, shown in FIGS. 1A-9C includes six dividers 16 forming six corresponding shell passes 25. In other embodiments (not shown), more than six dividers and shell passes can be created.

Figure 6:
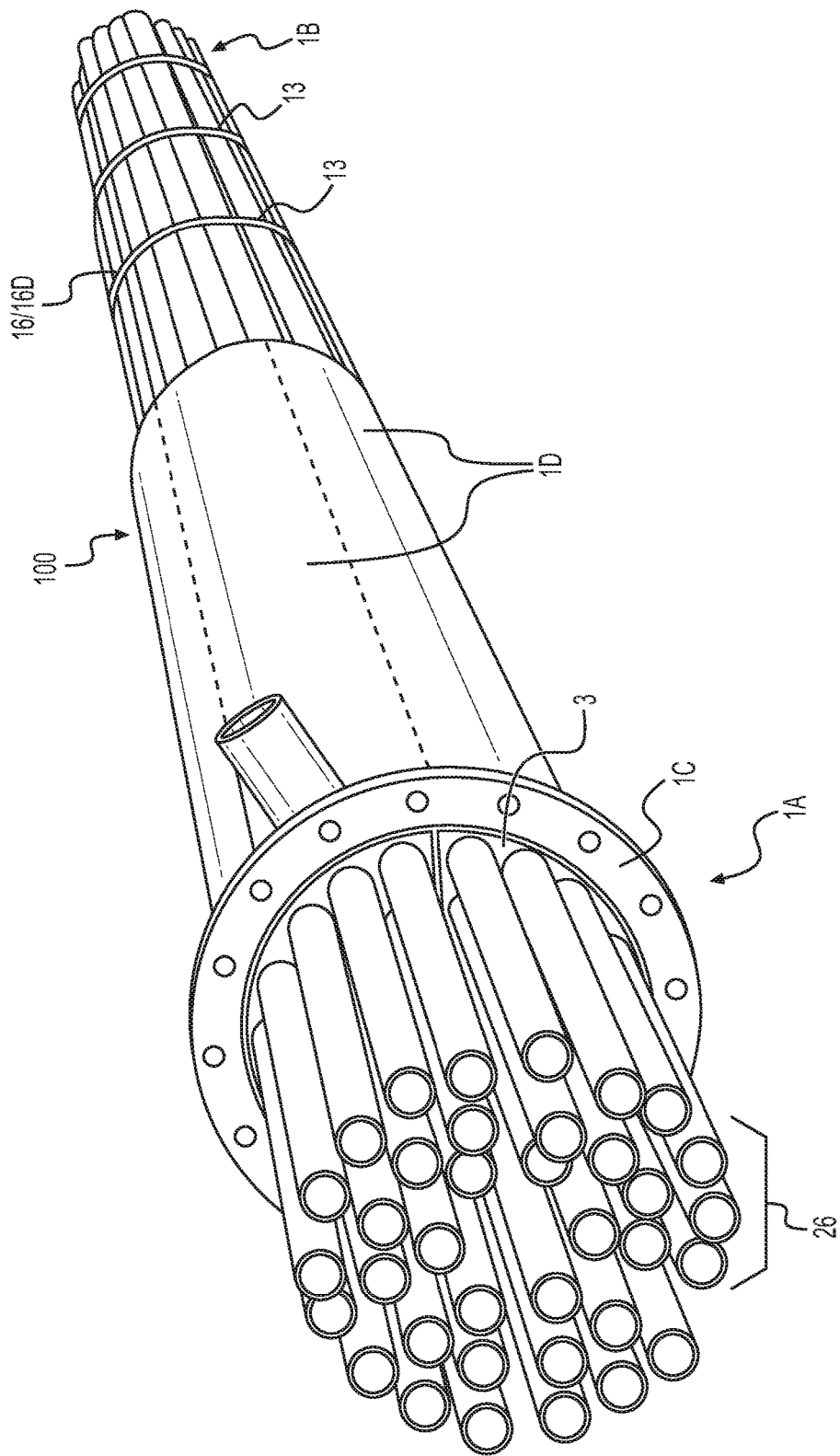
FIG. 6 is a side perspective photograph of parts of a heat exchanger, during fabrication, according to an exemplary embodiment.
Figure 7:
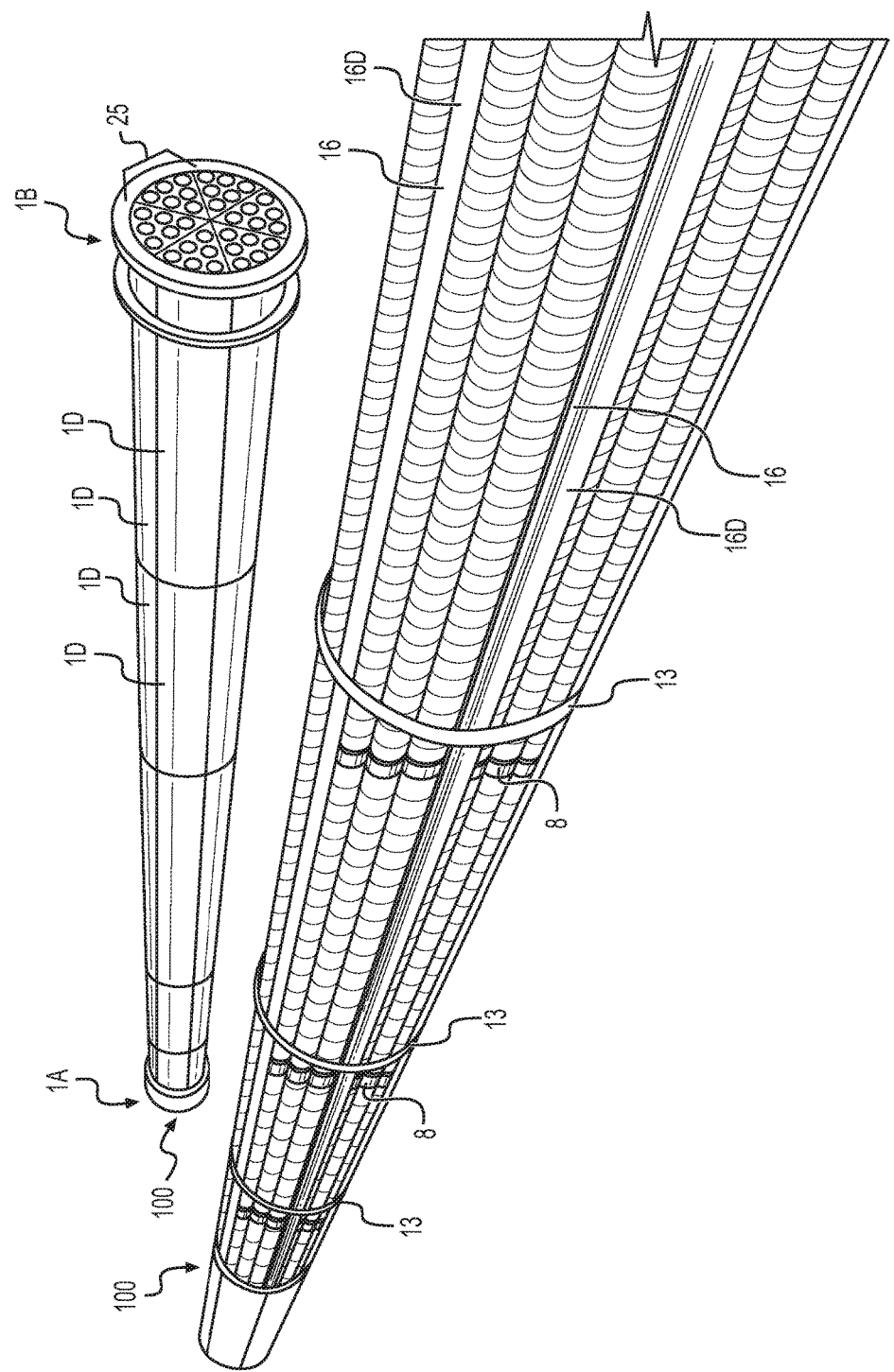
FIG. 7 is a side perspective photograph of parts of a heat exchanger, during fabrication, according to an exemplary embodiment.

Heat exchanger 100 can further comprise a plurality of tube passes 26. Each tube pass 26 can comprise a plurality of tubes 7 that extend longitudinally along the length of shell 1. A portion of tubes 7 can be shaped as a spiral corrugated tube, as shown in FIG. 7. The spiral corrugation can emulate the corrugated plates of a plate heat exchanger and can enhance turbulence of liquid flow on both sides of tubes 7. The number of tubes 7 forming each tube pass can vary from two to many, for example, three, four, five, six, eight, ten or more. The exemplary embodiment, as shown in FIGS. 1A-9C, can comprise six tubes 7 in each tube pass 26. Heat exchanger 100 can be configured such that each tube pass 26 can be contained within a corresponding shell pass 25.

Figure 5:
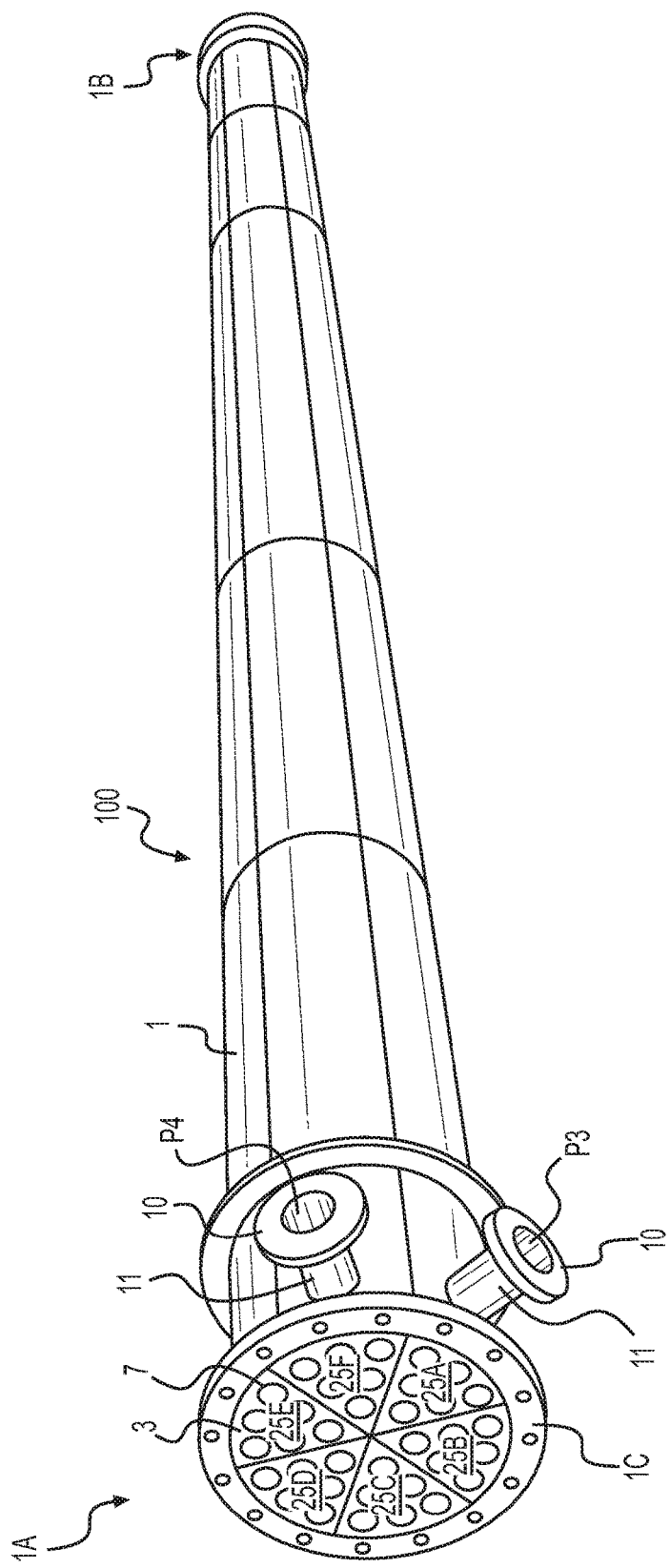
FIG. 5 is a side perspective photograph of parts of a heat exchanger, during fabrication, according to an exemplary embodiment.
Figure 9A:
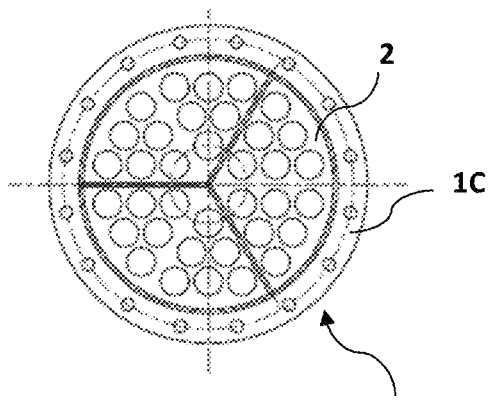
FIGS. 9A, 9B, and 9C are schematics of parts of a heat exchanger, according to an exemplary embodiment.
Figure 9B:
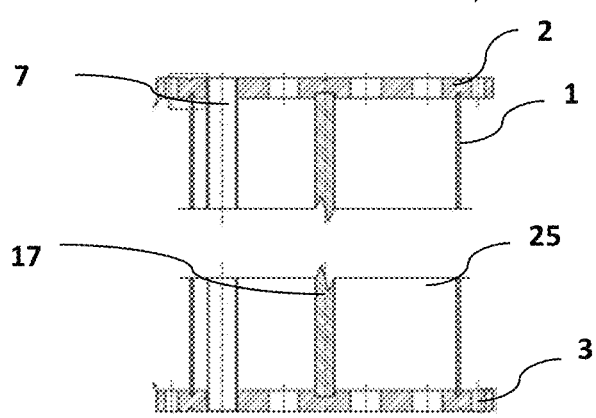
Figure 9C:
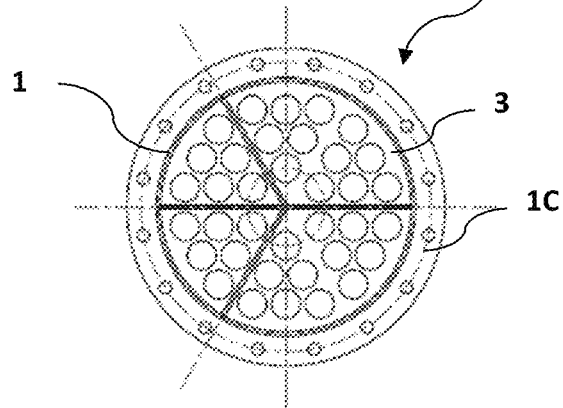

As shown in FIGS. 1A, 5, 9A, 9B, and 9C heat exchanger 100 can further comprise an upper tube sheet 2 and a lower tube sheet 3 located at each end of shell 1. Upper tube sheet 2 can be located nearest to second end 1B and lower tube sheet 3 can be located nearest to first end 1A. As shown in FIGS. 1A, 5, and 9B, upper and lower tube sheets 2/3 can be welded to each corresponding end of shell 1 along with the end sections of dividers 9 (not shown), round bar 17, and the plurality of tubes 7 of each tube pass 26 at first end 1A and second end 1B. Welding upper and lower tube sheets 2/3 as described can seal shell passes 25 at each end of shell 1. Another alternative can be that round bar 17 and dividers 16 are connected to upper and lower tube sheets 2/3 by slot fit connections, as shown in FIG. 9B. Another alternative can be that the plurality of tubes 7 of each tube pass 26 can be mechanically expanded into holes in the tube sheets 2/3 for liquid tight connection without welding.

Figure 1B:
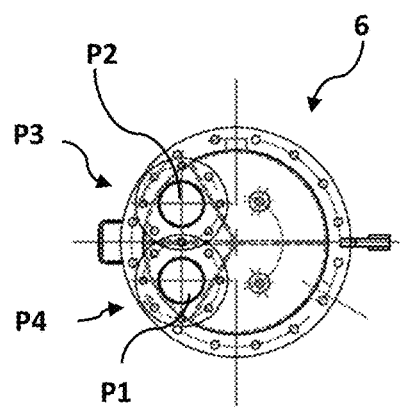
FIG. 1B is a bottom view of a heat exchanger, according to an exemplary embodiment.

Heat exchanger 100 can further comprise a shell inlet passage P3, as shown in FIGS. 1A, 1B, and 5. Shell inlet passage P3 can be configured to receive a first fluid 27 and supply it to a first shell pass 25A. Shell inlet passage P3 can be located near first end 1A of shell 1. Shell inlet passage P3 can comprise a flange 10 and pipe 11 that couples to the outer wall of shell 1 establishing fluid communication between shell inlet passage P3 and first shell pass 25A. First fluid 27 can be water or other commonly used heat exchanger liquid coolant or heated medium.

Heat exchanger 100 can further comprise a shell outlet passage P4, as shown in FIGS. 1B and 5. Shell outlet passage P4 can be configured to discharge first fluid 27 from a last shell pass (e.g., sixth shell pass 25F). Shell outlet passage P4 can be located near first end 1A of shell 1 adjacent to shell inlet passage P3, as shown in FIG. 5. Like shell inlet passage P3, shell outlet passage P4 can comprise a flange 10 and pipe 11, which couples to the outer wall of shell 1 establishing fluid communication between the shell outlet passage P4 and last shell pass (e.g., sixth shell pass 25F).

Heat exchanger 100 can further comprise a plurality of shell pass passages 30 formed in dividers 16. According to an exemplary embodiment, shell pass passages 30 can be configured to allow flow of first fluid 27 from first shell pass 25A, to a second shell pass 25B, to a third shell pass 25C, to a fourth shell pass 25D, to a fifth shell pass 25E, and onto a last sixth shell pass 25F.

As shown in FIGS. 2A-2D, dividers 16 can have different configurations of shell pass passages 30, for example, dividers 16A, 16B, and 16C. Divider 16A can comprise no shell pass passage 30, which can enable it to be positioned between first shell pass 25A and sixth shell pass 25F, as shown in FIG. 3A. Thus, it can be configured such that there is no direct intended fluid communication between these shell passes because they are the first and last shell passes 25 (e.g., 25A and 25F) in the flow path of first fluid 27. As described above, non-continuous welding of shell 1 and connecting surfaces 16D can potentially allow for minimal unintended bypassing or fluid communication of first fluid 27.

Dividers 16B and dividers 16C can both have at least one shell pass passage 30. As shown in FIGS. 2B and 2C, dividers 16B and 16C can each have two shell pass passages 30. Divider 16B can have two shell pass passages 30 adjacent one another in the region of first end 1A. Divider 16C can have two shell pass passages 30 adjacent one another in the region of second end 1B.

According to an exemplary embodiment, wherein heat exchanger 100 has six shell passes 25 and six corresponding tube passes 26 then six dividers 16 can be utilized comprising one divider 16A, two dividers 16B, and three dividers 16C, as shown in FIG. 3A. As described above, divider 16A can separate first shell pass 25A and sixth shell pass 25F. Dividers 16B can separate second shell pass 25B and third shell pass 25C as well as fourth shell pass 25D and fifth shell pass 25E. Dividers 16C can separate first shell pass 25A and second shell pass 25B, third shell pass 25C and fourth shell pass 25D, and fifth shell pass 25E and sixth shell pass 25F. This configuration can allow for the continuous flow of first fluid 27 from first shell pass 25A through all the other shell passes (e.g., 25B, 25C, 25D, 25E) to last shell pass (e.g., 25F) as first fluid 27 flows back and forth from first end 1A to second end 1B of heat exchanger 100.

Heat exchanger 100 can further comprise a pair of shell heads, an upper flanged head 5 and a lower flanged head 6, as shown in FIGS. 1A, 1B, 1C, 8A, 8B, 8C, and 8D. Upper flanged head 5 can be configured to couple to second end 1B of shell 1 and lower flanged head 6 can be configured to couple to first end 1A of shell 1. Upper and lower flanged head 5/6 can couple to shell 1 using various mechanisms. For example, FIG. 1 shows upper and lower flanged head 5/6 coupling to a shell flange 1C of shell 1 using nuts and bolts. The connection between upper and lower flanged head 5/6 and shell 1 can be sealed by a set of gaskets 12 configured to hermetically seal the connection.

Figure 8A:
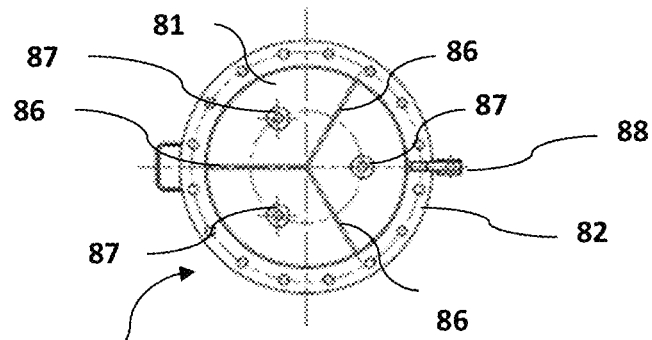
FIGS. 8A, 8B, 8C, and 8D are schematics of parts of a heat exchanger, according to an exemplary embodiment.
Figure 8B:
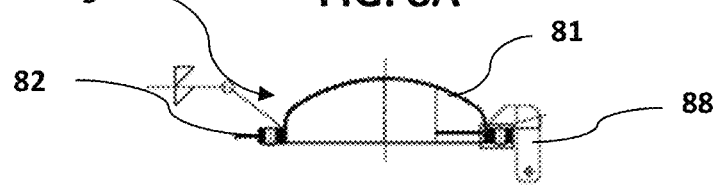

As shown in FIGS. 8A and 8B, upper flanged head 5 can comprise a dished head 81, flange 82, and a plurality of head dividers 86. Head dividers 86 can be configured to separate the volume within dished head 81 into separate chambers. According to an exemplary embodiment, as shown in FIG. 8A, three head dividers 86 can separate the volume within dished head 81 of upper flanged head 5 into three chambers, that can comprise an upper chamber UC1, UC2, and UC3. As shown in FIG. 8A, each head divider 86 can be separated by 120 degrees and extend outward from the center to the outer shell of dished head 81. Each of the three chambers (e.g., UC1, UC2, and UC3) can be configured to receive flow of second fluid 28 from a tube pass 26 and route it to the next subsequent tube pass 26. For example, upper chamber UC1 can route second fluid 28 from first tube pass 26A to second tube pass 26B, upper chamber UC2 can route second fluid 28 from third tube pass 26C to fourth tube pass 26D, and upper chamber UC3 can route second fluid 28 from fifth tube pass 26E to sixth tube pass 26F.

In other embodiments, the number of shell passes 25 and tube passes 26 can vary correspondingly to the number of head dividers 86 and chambers can also vary. As described above, flange 82 can be configured to bolt to a corresponding shell flange 1C located at second end 1B of shell 1. Upper flanged head 5 can further comprise a hinge mechanism 88 configured to couple to a corresponding hinge mechanism at second end 1B of shell 1. Upper flanged head 5 can further comprise of a plurality of ports 87 in fluid communication with chambers UC1, UC2, and UC3 formed by head dividers 86. Ports 87 can be plugged, or can be connected to a valve allowing for sampling of second fluid 28 from the chambers, or ports can be used to connect analytical transmitters for measuring process conditions (e.g., temperature, pressure, etc.).

Figure 8C:
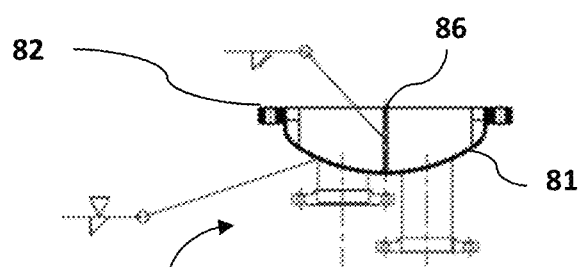
Figure 8D:
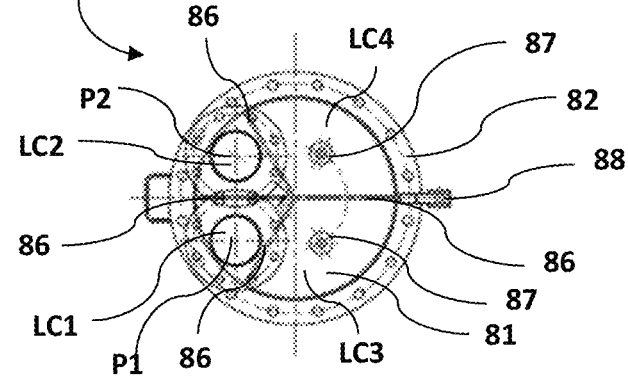

As shown in FIGS. 8C and 8D, lower flanged head 6 can comprise a dished head 81, flange 82, and a plurality of head dividers 86. Similar to upper flanged head 5, head dividers 86 can be configured to separate the volume within dished head 81 of lower flanged head 6 into separate chambers. Distinct for upper flanged head 5, lower flanged head 6 can be configured to comprise four head dividers 86 that separate the volume within dished head 81 into four lower chambers LC1, LC2, LC3, and LC4.

Heat exchanger 100 can further comprise a product inlet P1 and a product outlet P2, as shown in FIGS. 1B and 8D. Product inlet P1 can be configured to receive second fluid 28 and supply it to lower chamber LC1 and configured to route it into first tube pass 26A. Product outlet P2 can be configured to discharge second fluid 28 from sixth tube pass 26F through LC2. LC3 can be configured to route second fluid 28 from second tube pass 26B to third tube pass 26C. LC4 can be configured to route second fluid 28 from fourth tube pass 26D to fifth tube pass 26E.

Similar to upper flanged head 5, lower flange head 6 can further comprise a hinge mechanism 88 configured to couple to a corresponding hinge mechanism at first end 1A of shell 1. Lower flanged head 6 can further comprise a plurality of ports 87 in fluid communication with LC3 and LC4. The ports can be plugged, or can be connected to a valve allowing for sampling of second fluid 28 from each chamber, or ports 87 can be used to connect analytical transmitters for measuring process conditions (e.g., temperature, pressure, etc.).

Figure 3C:
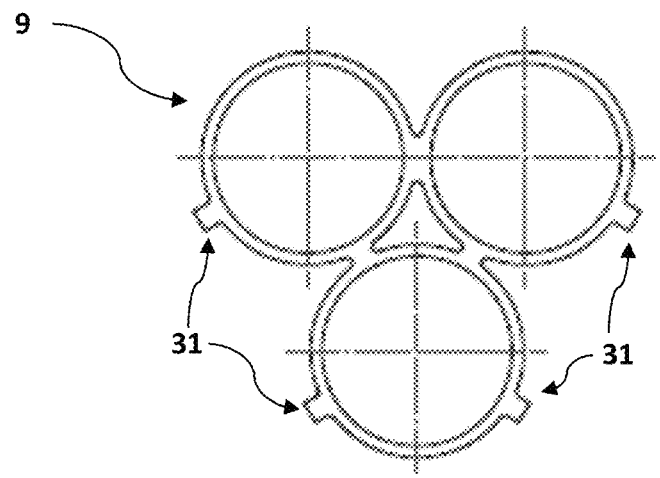
FIGS. 3C and 3D are schematics of parts of a heat exchanger, showing inside and outside baffles, according to an exemplary embodiment.
Figure 3D:
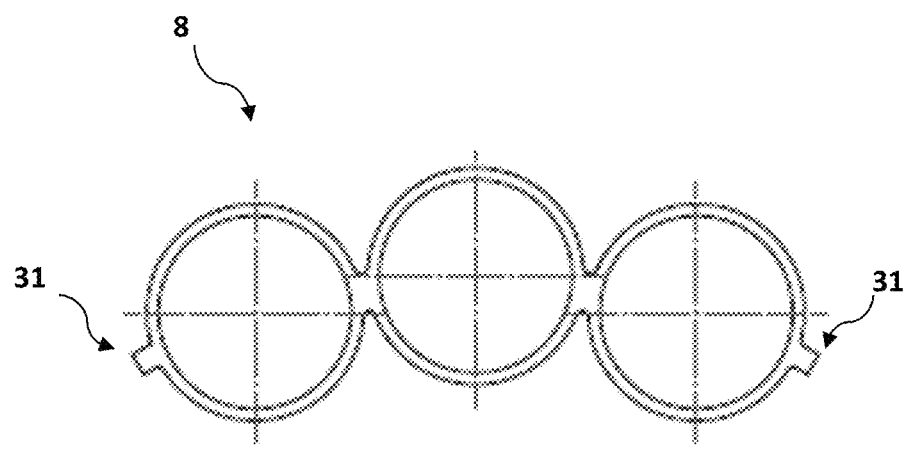

Heat exchanger 100 can further comprise a plurality of outside baffles 8 and a plurality of inside baffles 9. As shown in FIGS. 1A, 3C and 3D, outside baffles 8 can comprise a set of three rings coupled together. The three rings can be configured to receive three of the plurality of tubes 7 that comprise a given tube pass 26. As shown in FIG. 3D, the three tubes received by outside baffles 8 can be the three outermost tubes of a given tube pass 26. In other embodiments (not shown), outside baffles 8 can comprise more or less rings in order to accommodate more or less of the plurality of tubes that comprise a given tube pass 26. Outside baffles 8 can promote turbulence of first fluid 27 within each shell pass 25 as first fluid 27 is diverted around outside baffles 8 structure. While promoting turbulence outside baffles 8 can also be designed to be low in profile to reduce shell side pressure drop of first fluid 27.

Outside baffles 8 can be configured to assist in maintaining placement and minimizing lateral deflection of the plurality of tubes within a given shell pass 25. As shown in FIG. 3D, outside baffles 8 can include tabs 31 configured to contact dividers 16 on each side of outside baffle 8. Tabs 31 can be fixedly coupled (e.g., welded) to divider 16 or tabs 31 can rest against divider 16 allowing for some translational movement.

A plurality of outside baffles 8 can be positioned in shell passes 25. As shown in FIG. 1A, outside baffles 8 can be spaced along the length of shell 1. For example, the exemplary embodiment shown in FIG. 1A has outside baffles 8 evenly spaced out in five locations along the length of shell 1. The total number of outside baffles 8 utilized can vary depending on the number of positions along the length of shell 1 and the number of shell passes 25 and corresponding tube passes 26. For example, the exemplary embodiment shown in FIGS. 1A-9C comprises six shell passes 25 and six tube passes 26 and five outside baffle positions along the length of shell 1. Therefore, a total of thirty outside baffles 8 can be utilized allowing for placement of an outside baffle 8 in each of the six shell passes 25 at each of the five positions along the length of shell 1.

As shown in FIG. 3C, inside baffles 9 can comprise a set of three rings coupled together to form a triangular like shape. The three rings can be configured to receive three of the plurality of tubes 7 that comprise a given tube pass 26. As shown in FIG. 3C, the three tubes 7 received by inside baffles 9 can be the three innermost tubes 7 of a given tube pass 26. In other embodiments (not shown), inside baffles 9 can comprise more or less rings in order to accommodate more or less of the plurality of tubes that comprise tube pass 26. Inside baffles can promote turbulence of first fluid 27 within each shell pass 25 as first fluid 27 is diverted around inside baffles 9 structure. While promoting turbulence inside baffles 9 can at the same time be designed to be low in profile to reduce shell side pressure drop of first fluid 27.

Inside baffles 9 can be configured to assist in maintaining placement and minimize lateral deflection of the plurality of tubes within a given shell pass 25. As shown in FIG. 3C, inside baffles 9 can include tabs 31 configured to contact dividers 16 on each side of inside baffles 9. As described above, tabs 31 can be fixedly coupled to dividers 16 or tabs 31 can just rest against dividers 16.

A plurality of inside baffles 9 can be positioned in shell passes 25. As shown in FIG. 1A, inside baffles 9 can be spaced along the length of shell 1. For example, the exemplary embodiment shown in FIG. 1 has inside baffles 9 evenly spaced out in five locations along the length of shell 1. The total number of inside baffles 9 utilized can vary depending on the number of positions along the length of shell 1 and the number of shell passes 25 and corresponding tube passes 26. For example, the exemplary embodiment shown in FIGS. 1A-9C comprises six shell passes 25 and six tube passes 26 and five inside baffle 9 positions along the length of shell 1. Therefore, a total of thirty inside baffles 9 can be utilized allowing for placement of an inside baffle in each of the six shell passes 25 at each of the five positions along the length of shell 1.

As shown in FIG. 1A, the placement of outside baffles 8 and inside baffles 9 can be staggered along the length of shell 1. In other embodiments (not shown), the placement of outside baffles 8 and inside baffles 9 can correspond along the length of shell 1.

As indicated by the title and as described above, heat exchanger 100 can be configured such that flow of first fluid 27 through shell passes 25 is countercurrent to the flow of second fluid 28 through tube passes 26. This is arranged by having second fluid 28 supplied through product inlet P1 which is in fluid communication with first tube pass 26A contained within sixth shell pass 25F. The remaining tube passes 26 and shell passes 25 can be paired such that second tube pass 26B corresponds with fifth shell pass 25E, third tube pass 26C corresponds with fourth shell pass 25D, fourth tube pass 26D corresponds with third shell pass 25C, fifth tube pass 26E corresponds with second shell pass 25B, and sixth tube pass 26F corresponds with first shell pass 25A, as shown in FIG. 3A.

To increase performance and efficiency, heat exchanger 100 can be configured such that the total cross-sectional area of the plurality of tubes 7 of a given tube pass 26 is substantially equal to a total cross-sectional area outside the plurality of tubes and inside the shell of a given shell pass 25 (i.e., shell pass flowable cross-sectional area). Substantially equal can constitute wherein the total tube cross-sectional area of a tube pass ranges from 70% to 130%, 80% to 120%, 90% to 110%, 95% to 105%, or 99% to 101% of the shell pass flowable cross-sectional area. Designing shell passes 25 and tube passes 26 such that the cross-sectional area available for first fluid 27 and second fluid 28 to flow is substantially equal can maximize the heat transfer performance of heat exchanger 100 based on the given size.

Heat exchanger 100 can be configured for vertical, horizontal, or angled orientation. Heat exchanger 100 as described can be configured such that there are a limited number of gaskets (e.g., two of gasket 12) when compared to other heat exchanger designs particularly plate and frame heat exchangers. By limiting the number of gaskets heat exchanger 100 can be vacuum tight. A vacuum tight construction can allow heat exchanger 100 to be used in applications that would otherwise be impractical for a plate and frame heat exchanger due to their propensity for leaks.

Heat exchanger 100 as described above can be constructed in various lengths and diameters. As shown in FIG. 1A, heat exchanger 100 according to an exemplary embodiment can be constructed to extend to greater than about 30 feet in length at a diameter of about 18 inches. However, due to the modular section design of heat exchanger 100, the length and diameter can be reduced or increased. For example, heat exchanger 100 can be configured to a length of about 5 feet, 10 feet, 15 feet, 20 feet, 25 feet, 35 feet, 40 feet, 45 feet, 50 feet or more. Similarly, heat exchanger 100 can be configured to be less than 18 inches in diameter or greater than 18 inches in diameter for example, 6 inches, 8 inches, 10 inches, 12 inches, 16 inches, 24 inches, or 36 inches.

Manufacturing tube and shell heat exchangers of extended length (e.g., greater than 30 feet) can often be challenging as a result of the stacking and multiplying of material tolerances that take place as the length of components increase.

Heat exchanger 100 as described above can be manufactured in modular sections which reduces the effect of stacking and multiplying tolerances allowing for heat exchanger 100 to be manufactured to extended lengths (e.g., 30 feet or greater). A method of manufacturing heat exchanger 100 is described below in greater detail.

A method of manufacturing heat exchanger 100 can comprise a plurality of steps. FIGS. 5-7 show one or more heat exchangers 100 at various points during the manufacturing process. As shown in FIG. 7, the method can comprise inserting a plurality of tubes 7 through a plurality of outside baffles 8 and inside baffles 9 (not visible). The plurality of baffles 8/9 can be spaced along the length of heat exchanger 100 and configured to maintain the placement of the plurality of tubes 7 within a given shell pass 25. The method can further comprise selecting tubes 7 for the plurality of tubes wherein at least a portion of each tube is a corrugated spiral.

The method of manufacturing heat exchanger 100 can further comprise separating the plurality of tubes 7 into separate tube passes 26 using a plurality of dividers 16 that extend longitudinally along the length of heat exchanger 100, as shown in FIG. 6. Dividers 16 can also extend axially outward from the center region to the outer region of heat exchanger 100. Dividers 16 can be coupled (e.g., hermetically sealed or slotted connection) to a round bar 17 (not visible in FIGS. 5-7) that can be positioned in the center of heat exchanger 100 run longitudinally along the length from first end 1A to second end 1B. As described above dividers 16 can include a connecting surface 16D that can extend beyond the plurality of tubes and curve around a portion of at least one of the tubes in a given tube pass 26. The acute angle between the inner surface of connecting surface 16D and divider 16 can be between about 85 degrees and about 90 degrees such that the connecting surface 16D corresponds to the outer circumference of heat exchanger 100.

Figure 3G:
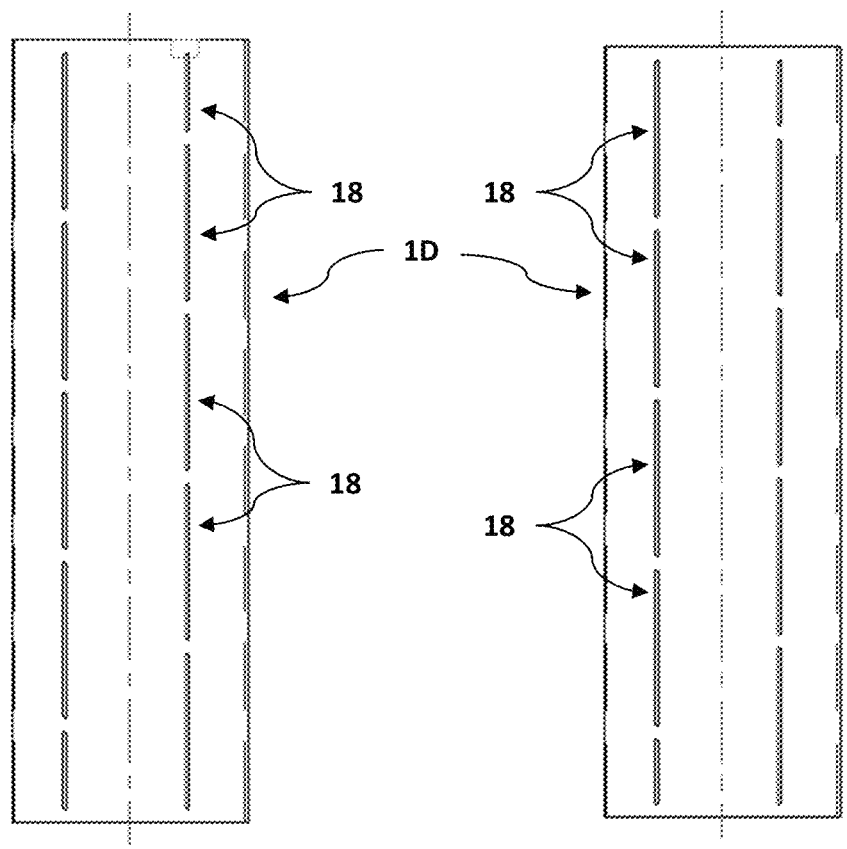
FIG. 3G is a schematic of parts of a heat exchanger, showing backing strips, according to an exemplary embodiment.
Figure 3G:
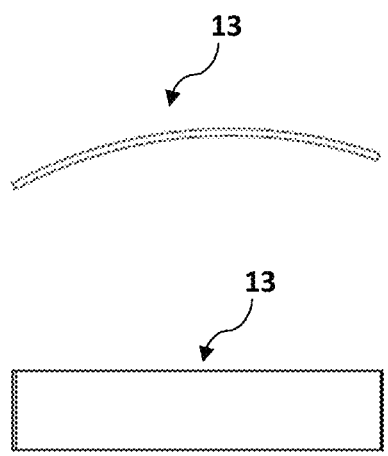

As shown in FIGS. 1A and 7, the method of manufacturing heat exchanger 100 can further comprise spacing rings of backing strips 13 along the length of heat exchanger 100 and wrapping backing strips 13 around the circumference of the tube passes 26 and coupling the backing strip 13 to the connecting surface 16D of each divider 16. Each backing strip ring can comprise a plurality of backing strips 13 as shown in FIG. 3G. As shown in FIG. 7, the number of backing strips 13 per ring can correspond to the number of shell passes 25 and tube passes 26. Backing strips 13 can be coupled to connecting surfaces 16D such that the surfaces of each component are substantially flush with one another, as shown in FIG. 7.

As shown in FIGS. 5 and 6, the method can further comprise fixing tube sheets 2/3 and flanges 1C to each end of the plurality of tubes 7. Each of the plurality of tubes 7 can be hermetically sealed (e.g., welded) to the tube sheets or mechanically expanded into holes in the tube sheets 2/3 to form a tight mechanical connection that prevents comingling of first fluid 27 and second fluid 28. In addition divider 9 and round bar 17 can be coupled (e.g., seal welded or slotted connection) to the tube sheets 2/3, as shown in FIG. 9B.

The method can further comprise coupling flanged heads 5/6 to each shell flange 1C, as shown in FIG. 1A. The method can further comprise dividing each flanged head into a plurality of chambers (e.g., LC1, LC2, and LC3 or UC1, UC2, and UC3) and each chamber can be configured to route flow of a second fluid 28 from one tube pass 26 to the next tube pass 26. As described above, the flanged heads can further comprise a product inlet P1 and a product outlet P2.

As shown in FIG. 6, the method can further comprise attaching a plurality of shell sections 1D, wherein a given shell section 1D extends radially along the circumference of a tubes pass 26 from one divider 16 to the adjacent divider 16 while extending longitudinally along the corresponding tubes pass 26 from one backing strip 13 to the adjacent backing strip 13. The shell section 1D along with the corresponding dividers can form a portion of the corresponding shell pass 25. Attaching each shell section 1D can comprise welding (e.g., tack welding) the section to the corresponding dividers 16 connecting surfaces 16D and making a lengthwise weld of the tube shell section to form a full weld joint between the shell section and the corresponding connecting surfaces, as shown in FIGS. 3A, 5, and 6.

Alternatively, as shown in FIGS. 3E and 3F, multiple shell sections 1D can be formed from a single sheet of metal and slots 18 can be laser cut into the sheet at appropriate locations to correspond to the locations where connecting surfaces 16D of the dividers 16 are configured for welding of shell 1 connecting surfaces 16D.

As shown in FIG. 6, the method can comprise attaching the plurality of shell sections 1D beginning at one end (e.g., first end 1A) and installing shell sections 1D such that the full circumference of that length of heat exchanger 100 is completed prior to moving to the next adjacent length of heat exchanger 100 working toward the other end (e.g., second end 1B).

The method can further comprise installing a shell inlet passage P3 configured to receive a first fluid 27 into first shell pass 25A and a shell outlet passage P4 configured to discharge first fluid 27 from sixth shell pass 25F, as shown in FIG. 5.

The method described herein can enable the manufacturing of liquid to liquid multi-pass countercurrent heat exchanger 100 at varying lengths. For example, heat exchanger 100 shown in FIGS. 5-7 can be greater than about 30 feet in length.

As shown in FIGS. 5-7, heat exchanger 100 manufactured according to the method described above can contain at least six separate tube passes 26 and six separate shell passes 25. The method can further comprise of sizing the tube passes 26 and shell passes 25 such that a total cross-sectional area of the plurality of tubes 7 of each tube pass 26 is substantially equal to a total cross-sectional area outside the plurality of tubes 7 and inside the corresponding shell pass 25.

Figure 4:
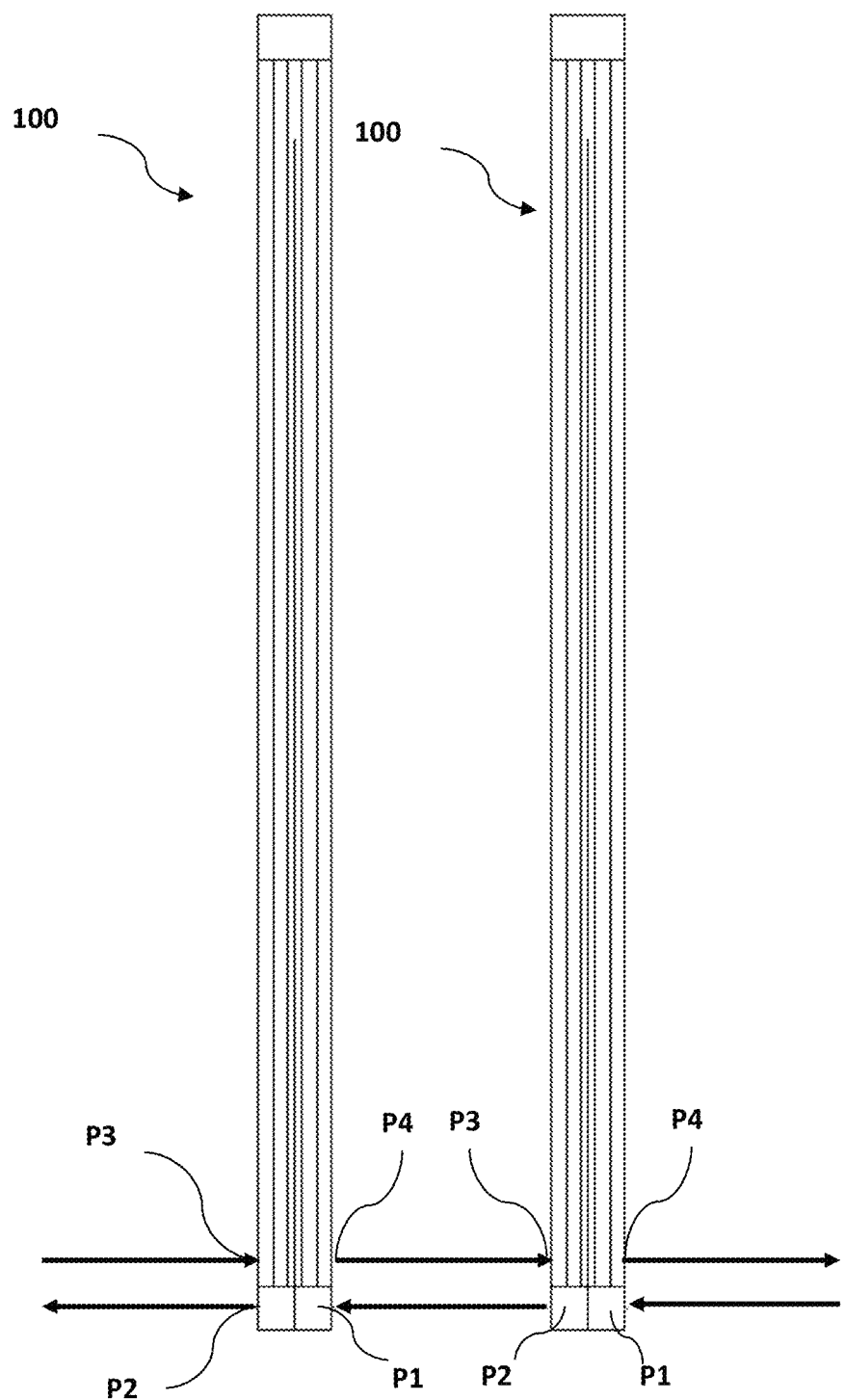
FIG. 4 is a flow schematic of heat exchangers, according to an exemplary embodiment.

In other embodiments, heat exchanger 100 as described above can be arranged in series with additional heat exchangers 100 as shown in FIG. 4

The unique tube and shell design of heat exchanger 100 can provide the vacuum tight, non-plugging, robust industrial performance of a classical tube and shell heat exchanger with a minimum number of gaskets and accomplishing the process engineering refinement of a countercurrent plate or spiral heat exchanger. In addition, the modular design and manufacturing method can allow for variability in design length and diameter.

Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. A heat exchanger, comprising:
   a shell forming a generally cylindrical housing having an inner surface;
   a plurality of dividers within the shell longitudinally extending along the length of the shell and extending axially outward from the center region of the shell toward the inner surface of the shell, the outer axial portion of each divider further comprising a connecting surface, wherein the connecting surface is positioned at an angle of about 85 to about 90 degrees from the divider, and the connecting surface is fixedly attached to the inner surface of the shell forming a hermetic seal, wherein the dividers separate the shell into sections and each section forms a shell pass;
   a plurality of tube passes, wherein at least one tube pass is contained within each of the shell passes, and each tube pass comprises a plurality of tubes extending along the length of the shell;
   a shell inlet passage configured to receive a first fluid into a first shell pass and a shell outlet passage configured to discharge the first fluid from a last shell pass;
   a plurality of shell pass passages formed in the dividers near a first end or a second end of the shell configured to allow flow of the first fluid from one shell pass to the next shell pass;
   a tube inlet passage configured to receive a second fluid into a first tube pass and a tube outlet passage configured to discharge the second fluid from a last tube pass;
   a pair of shell heads configured to couple to the first end and the second end of the shell, wherein each shell head is divided into a plurality of chambers and each chamber is configured to route flow of the second fluid from one tube pass to the next tube pass; and
   wherein a total cross-sectional area of the plurality of tubes of a tube pass is substantially equal to a total cross-sectional area outside the plurality of tubes of the tube pass and inside the corresponding shell pass.

2. The heat exchanger of claim 1, wherein the connecting surfaces and the shell are fixedly attached by full weld joints.

3. The heat exchanger of claim 1, further comprising a plurality of baffles positioned with the shell passes and configured to receive the plurality of tubes within a pass and maintain the position of the tubes within the shell.

4. The heat exchanger of claim 1, wherein a flow of the first fluid through the shell passes is countercurrent to a flow of the second fluid through the tube passes.

5. The heat exchanger of claim 1, wherein the heat exchanger is installed in a vertical, horizontal or angled orientation.

6. The heat exchanger of claim 1, wherein the heat exchanger is configured to be vacuum tight.

7. The heat exchanger of claim 1, wherein each shell pass has substantially equal cross-sectional area.

8. The heat exchanger of claim 1, wherein the length is greater than about 30 ft.

9. A heat exchanger, comprising:
   a shell forming a generally cylindrical housing having an inner surface;
   at least two dividers within the shell longitudinally extending along the length of the shell and extending axially outward from the center region of the shell toward the inner surface of the shell, the outer axial portion of each divider further comprising a connecting surface configured to mate generally parallel with the inner surface of the shell, wherein the connecting surfaces and the shell are fixedly attached by a full weld joint and the dividers separate the shell into sections and each section forms a shell pass; and
   a plurality of tube passes, wherein at least one tube pass is contained within each of the shell passes, and each tube pass comprises a plurality of tubes extending along the length of the shell;
   wherein a total cross-sectional area of the plurality of tubes of a tube pass is substantially equal to a total cross-sectional area outside the plurality of tubes and inside the corresponding shell pass.

* * * * *